Patented Nov. 3, 1936

2,059,800

UNITED STATES PATENT OFFICE 2,059,800

4-AMINO-DINITRO-DIPHENYLAMINES AND PROCESS OF PREPARING THEM

Leopold Laska and Rudolf Heil, Offenbach-on-the-Main, Germany, assignors to General Aniline Works, Inc., New York, N. Y., a corporation of Delaware No Drawing. Application May 31, 1935, Serial No. 24,453. In Germany June 2, 1934

4 Claims. (Cl. 260—128)

The present invention relates to 4-amino-dinitro-diphenylamines and to a process of preparing them; more particularly it relates to compounds corresponding to the following formula:

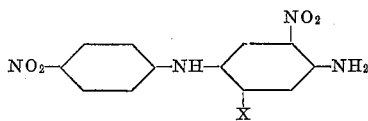

wherein X stands for hydrogen or the methyl group.

We have found that 4-amino-dinitrodiphenylamines may be obtained in a smooth reaction by condensing 4-nitro-1-chlorobenzene-2-sulfonic acid with 1,4-diamino-3-nitrobenzene and 1,4-diamino-3-nitro-6-methylbenzene, respectively, and splitting off the sulfonic acid group in known manner from the 4-amino-3,4'-dinitro-diphenylamine-2'-sulfonic acid and the 4-amino-6-methyl-3,4'-dinitro-diphenylamine-2'-sulfonic acid, respectively, thus obtained.

It is known from the pertaining literature to condense 4-nitro-1-chlorobenzene-2-sulfonic acid with aromatic amines and to split off the sulfonic acid group from the diphenylamine-sulfonic acids thus obtained; on the basis of the statements made therein, however, no conclusions can be drawn as to what extent the condensation of 4-nitro-1-chlorobenzene-2-sulfonic acid with nitrated aromatic amines could be carried out. In fact, 4-nitro-1-chlorobenzene-2-sulfonic acid cannot be condensed with nitro-m-phenylenediamine (1-nitro-2,4-diaminobenzene), and, therefore, it could not be foreseen that the condensation can be carried out with 1,4-diamino-3-nitrobenzene and 1,4-diamino-3-nitro-6-methylbenzene, respectively, the nitro group of which is also in ortho position to an amino group.

The 4-amino-3,4'-dinitrodiphenylamine, and the 4-amino-6-methyl-3,4'-dinitrodiphenylamine, respectively, thus obtained are valuable starting materials for the manufacture of azo-dyestuffs and cannot be obtained by another method in the same satisfactory manner.

The following examples serve to illustrate the invention; the parts are by weight:

(1) A mixture of 153 parts of 3-nitro-1,4-diaminobenzene, 380 parts of the sodium salt of 1-chloro-4-nitrobenzene-2-sulfonic acid (having a content of 68 per cent calculated upon acid, molecular weight 237.5) and 80 parts of calcium carbonate in 1500 parts of water is heated at 130° C. to 135° C. in a pressure vessel for 24 hours. The content of the vessel is filtered while hot and the residue remaining on the filter is boiled out with water with addition of a small quantity of sodium carbonate, filtered and the combined filtrates are evaporated until formation of a salt film. After cooling the dark-brown crystalline precipitate is filtered with suction and dried. The 4-amino-3,4'-dinitro-diphenylamine-2'-sulfonic acid thus obtained is introduced, while stirring, into twelve times its weight of sulfuric acid of 78% strength and heated at 90° C. to 95° C. for 20 minutes. Thereby the sulfonic acid group is split off. The reaction mass is poured upon ice, filtered with suction and the residue remaining on the filter is extracted with hot dilute aqueous ammonia in order to remove any sulfonic acid which may still be present, washed with water and dried.

The 4-amino-3,4'-dinitrodiphenylamine thus obtained crystallizes from trichlorobenzene in the form of small dark-brown needles melting at 226° C. to 227° C.

The analysis shows: obtained: N 20.45%
                      calculated: N 20.45%

(2) A mixture of 300 parts of 6-methyl-3-nitro-1,4-diaminobenzene, 680 parts of the sodium salt of 4-nitro-1-chlorobenzene-2-sulfonic acid (having a content of 62 per cent calculated upon acid, molecular weight 237.5) and 150 parts of calcium carbonate in 2500 parts of water is heated at 140° C. in a pressure vessel for 24 hours. The content of the vessel is then filtered while hot and the residue remaining on the filter is extracted with hot water. To the combined filtrates there are added 110 parts of calcium chloride and the whole is evaporated until the formation of a salt film sets in. The whole is allowed to cool and the precipitated calcium salt of 4-amino-6-methyl-3,4'-dinitro-diphenylamine-2'-sulfonic acid is filtered with suction, pressed and dried. In order to split off the sulfonic acid group it is introduced into 10 times its weight of sulfuric acid of 78% strength at about 60° C. and heated at 100° C. for about 15 minutes. The reaction mass is then introduced into ice water, while stirring, the precipitate is filtered with suction and washed with water. In order to remove any sulfonic acid which may still be present the moist product is stirred with water and a small quantity of ammonia is added, the whole is boiled for a short time, again filtered with suction, washed with hot water and dried. The 4-amino-6-methyl-3,4'-dinitrodiphenylamine obtained may be recrystallized from dichlorobenzene or glacial acetic acid. The product is recrystallized from glacial acetic acid and dried at 110° C. It then melts at 221° C.

The analysis shows: obtained: N 19.6%
calculated: N 19.45%

We claim:

1. The process which comprises condensing 4-nitro-1-chlorobenzene-2-sulfonic acid with compounds of the following formula

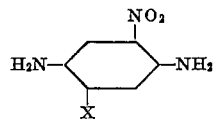

wherein X stands for one of the group consisting of hydrogen and methyl, and splitting off the sulfonic acid group from the condensation products, thus obtained.

2. The 4-amino-dinitro-diphenylamines of the following formula

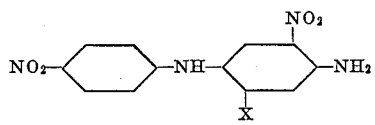

wherein X stands for one of the group consisting of hydrogen and methyl, being crystallized brown colored compounds which dissolve in concentrated sulfuric acid to a yellow-red solution.

3. The 4-amino-3,4'-dinitrodiphenylamine of the following formula

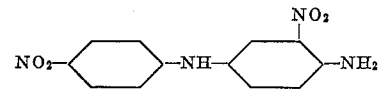

crystallizing from trichlorobenzene in the form of small dark brown needles melting at 226° to 227° C.

4. The 4-amino-6-methyl-3,4'-dinitrodiphenylamine of the following formula:

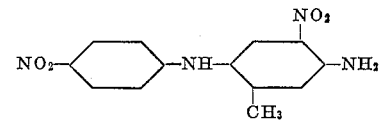

which melts at 221° C. when recrystallized from glacial acetic acid.

LEOPOLD LASKA.
RUDOLF HEIL.